United States Patent
Nakazono et al.

(10) Patent No.: US 7,525,577 B2
(45) Date of Patent: Apr. 28, 2009

(54) IMAGE PROCESSING APPARATUS AND IMAGE PROCESSING METHOD

(75) Inventors: Keisuke Nakazono, Hino (JP); Akira Ueno, Akiruno (JP)

(73) Assignee: Olympus Corporation, Tokyo (JP)

( * ) Notice: Subject to any disclaimer, the term of this patent is extended or adjusted under 35 U.S.C. 154(b) by 869 days.

(21) Appl. No.: 10/921,393

(22) Filed: Aug. 19, 2004

(65) Prior Publication Data

US 2005/0088539 A1    Apr. 28, 2005

(30) Foreign Application Priority Data

Aug. 25, 2003  (JP)  ............................. 2003-299665
Aug. 9, 2004   (JP)  ............................. 2004-231826

(51) Int. Cl.
*H04N 5/76* (2006.01)
(52) U.S. Cl. .................................................. 348/231.3
(58) Field of Classification Search ............. 348/231.3, 348/230.1, 231.6, 231.9; 345/530, 531, 536, 345/537, 649, 654; 711/217
See application file for complete search history.

(56) References Cited

U.S. PATENT DOCUMENTS 5,270,831 A * 12/1993 Parulski et al. .............. 358/403
6,943,834 B1 * 9/2005 Hirai ....................... 348/231.6

FOREIGN PATENT DOCUMENTS

JP        2000-312327        11/2000

* cited by examiner

*Primary Examiner*—Lin Ye
*Assistant Examiner*—Amy Hsu
(74) *Attorney, Agent, or Firm*—Straub & Pokotylo; John C. Pokotylo

(57) ABSTRACT

Disclosed herein is an image processing apparatus including: a first memory for storing image data; a first write control section for, when image data are written into the first memory, writing the image data in different write sequence depending on whether a rotation of image is to be effected in forming the image or not; a first read control section for reading image data using read addresses and read sequence corresponding to the rotation of image when image data are read out from the first memory; a second memory for storing image data read out from the first memory; and a second write control section for writing image data into the second memory by write start address and write sequence corresponding to the rotation of the image stored in the first memory.

16 Claims, 12 Drawing Sheets

SDRAM

3

SRAM OF INPUT DMA

SRAM OF INPUT DMA

FIG. 8A
WITHOUT ROTATION
WRITE
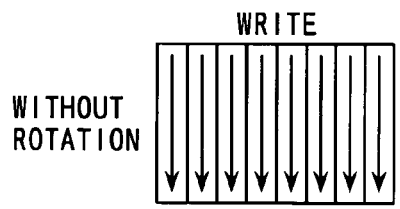
FIG. 8C
ROTATION
WRITE
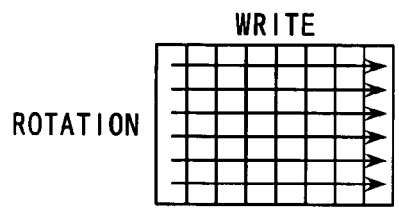
FIG. 8B
READ
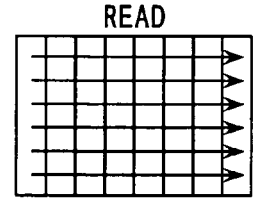
FIG. 9A
| ROW | | | | | | | | | | | | | | | | COLUMN → |
|---|---|---|---|---|---|---|---|---|---|---|---|---|---|---|---|---|
| 1 | 9 | 17 | 25 | 33 | 41 | 49 | 57 | 65 | 73 | 81 | 89 | 97 | 105 | 113 | 121 |
| 2 | 10 | 18 | 26 | 34 | 42 | 50 | 58 | 66 | 74 | 82 | 90 | 98 | 106 | 114 | 122 |
| 3 | 11 | 19 | 27 | 35 | 43 | 51 | 59 | 67 | 75 | 83 | 91 | 99 | 107 | 115 | 123 |
| 4 | 12 | 20 | 28 | 36 | 44 | 52 | 60 | 68 | 76 | 84 | 92 | 100 | 108 | 116 | 124 |
| 5 | 13 | 21 | 29 | 37 | 45 | 53 | 61 | 69 | 77 | 85 | 93 | 101 | 109 | 117 | 125 |
| 6 | 14 | 22 | 30 | 38 | 46 | 54 | 62 | 70 | 78 | 86 | 94 | 102 | 110 | 118 | 126 |
| 7 | 15 | 23 | 31 | 39 | 47 | 55 | 63 | 71 | 79 | 87 | 95 | 103 | 111 | 119 | 127 |
| 8 | 16 | 24 | 32 | 40 | 48 | 56 | 64 | 72 | 80 | 88 | 96 | 104 | 112 | 120 | 128 |
FIG. 9B
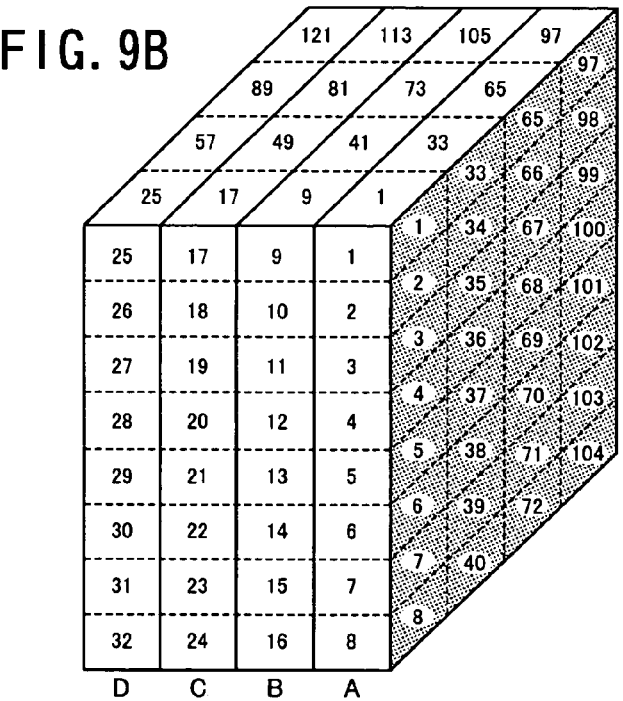

| 1 | 17 | 33 | 49 | 65 | 81 | 97 | 113 |
|---|---|---|---|---|---|---|---|
| 2 | 18 | 34 | 50 | 66 | 82 | 98 | 114 |
| 3 | 19 | 35 | 51 | 67 | 83 | 99 | 115 |
| 4 | 20 | 36 | 52 | 68 | 84 | 100 | 116 |
| 5 | 21 | 37 | 53 | 69 | 85 | 101 | 117 |
| 6 | 22 | 38 | 54 | 70 | 86 | 102 | 118 |
| 7 | 23 | 39 | 55 | 71 | 87 | 103 | 119 |
| 8 | 24 | 40 | 56 | 72 | 88 | 104 | 120 |
| 9 | 25 | 41 | 57 | 73 | 89 | 105 | 121 |
| 10 | 26 | 42 | 58 | 74 | 90 | 106 | 122 |
| 11 | 27 | 43 | 59 | 75 | 91 | 107 | 123 |
| 12 | 28 | 44 | 60 | 76 | 92 | 108 | 124 |
| 13 | 29 | 45 | 61 | 77 | 93 | 109 | 125 |
| 14 | 30 | 46 | 62 | 78 | 94 | 110 | 126 |
| 15 | 31 | 47 | 63 | 79 | 95 | 111 | 127 |
| 16 | 32 | 48 | 64 | 80 | 96 | 112 | 128 |

COLUMN →
ROW ↓

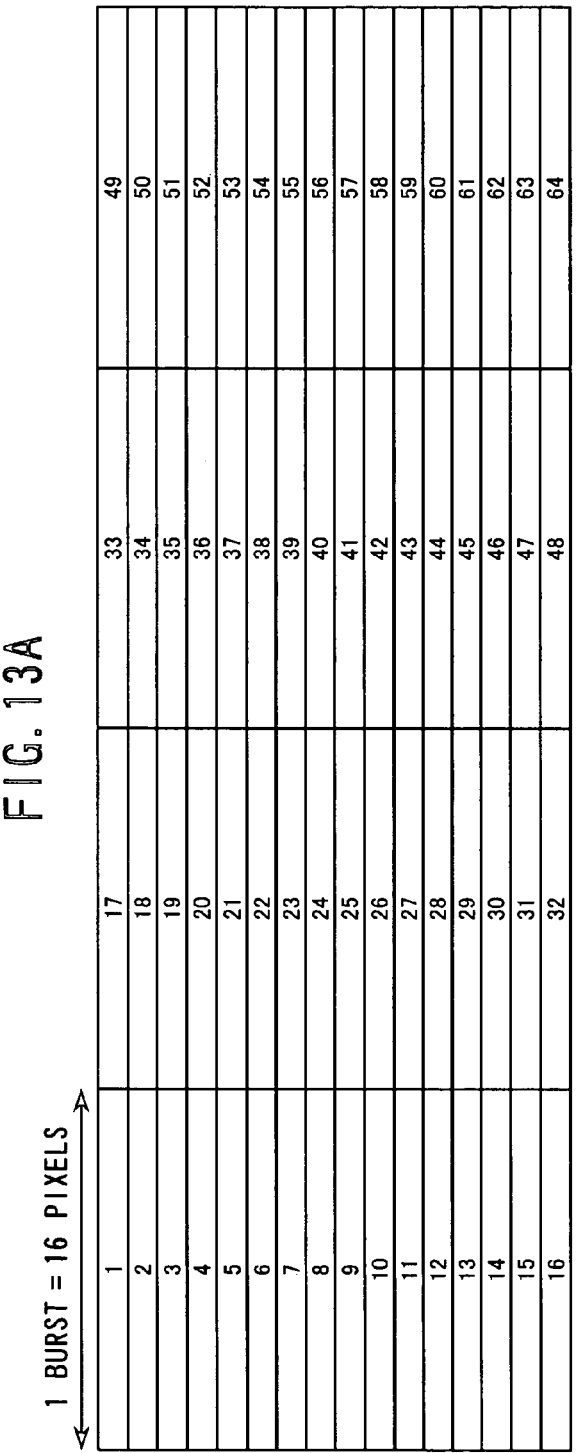

IMAGE PROCESSING APPARATUS AND IMAGE PROCESSING METHOD

This application claims benefit of Japanese Patent Applications No. 2003-299665 filed in Japan on Aug. 25, 2003 and No. 2004-231826 filed in Japan on Aug. 9, 2004, the contents of which are incorporated by this reference.

BACKGROUND OF THE INVENTION

The present invention relates to image processing apparatus and image processing methods for use in a digital camera or the like.

In general, with a digital camera or the like using a solid-state imaging device such as CCD, various types of image processing are effected on image signals outputted from the solid-state imaging device so that image data obtained from the image processing are displayed on a display section or recorded into a recording medium such as memory card. The image processing on the image signals may include a processing for rotating image, and a rotated image by such rotation processing is obtained for example by an address conversion through an operation processing.

On the other hand, Japanese Patent Application Laid-Open 2000-312327 for example discloses a system in which, when image processing of one frame is to be effected in executing each type of image processing on the image signals, the image data corresponding to one frame is stripped into a number of small block image data (referred to as block line) and sequential processing is effected by each block line to reduce transmitted data amount so that a plurality of types of image processing can be effected through a small-capacity memory.

SUMMARY OF THE INVENTION

It is an object of the present invention to provide an image processing apparatus and image processing method in which, in order to obtain a rotated image, image processing and rotation processing can be readily effected without requiring a special construction and complicated operation processing.

In a first aspect of the invention, there is provided an image processing apparatus including: a first memory for storing image data; a first write control section for, when image data are written into the first memory, writing the image data in different write sequence depending on whether a rotation of image is to be effected in forming the image or not; a first read control section for reading image data using read addresses and read sequence corresponding to the rotation of image when image data are read out from the first memory; a second memory for storing image data read out from the first memory; and a second write control section for writing image data into the second memory by write start address and write sequence corresponding to the rotation of the image stored in the first memory.

In a second aspect of the invention, there is provided an image processing apparatus including: a first memory for storing image data; a first write control means for, when image data are written into the first memory, writing the image data in different write sequence depending on whether a rotation of image is to be effected in forming the image or not; a first read control means for reading image data using read addresses and read sequence corresponding to the rotation of image when image data are read out from the first memory; a second memory for storing image data read out from the first memory; and a second write control means for writing image data into the second memory by write start address and write sequence corresponding to the rotation of the image stored in the first memory.

In a third aspect of the invention, there is provided an image processing apparatus including: a first memory for storing image data; a first memory control section for, when an image is to be formed with a rotation of the image, writing image data with controlling write start address and write sequence into the first memory and for reading the image data in a rearranged manner with controlling read sequence of the first memory corresponding to the rotation of the image data; and a second memory control section for, when image data read out from the first memory are written into a second memory different from the first memory, writing the image data in a rearranged manner with controlling write sequence into the second memory corresponding to the rotation of the image data stored in the first memory.

In a fourth aspect of the invention, there is provided an image processing apparatus including: a first memory for storing image data; a first memory control means for, when an image is to be formed with a rotation of the image, writing image data with controlling write start address and write sequence into the first memory and for reading the image data in a rearranged manner with controlling read sequence of the first memory corresponding to the rotation of the image data; and a second memory control means for, when image data read out from the first memory are written into a second memory different from the first memory, writing the image data in a rearranged manner with controlling write sequence of the second memory corresponding to the rotation of the image data stored in the first memory.

In a fifth aspect of the invention, there is provided an image processing apparatus capable of effecting image processing after a horizontal/vertical conversion where change is made from horizontal scanning to vertical scanning with treating image data as divided into block data and of effecting an inverse horizontal/vertical conversion again of the processing result thereof to form horizontally scanned image data, including: a first memory for storing the image data subjected to the image processing after the horizontal/vertical conversion; a first write control section for, when the image data are written into the first memory, writing the image data in different write sequence depending on whether a rotation of image is to be effected in forming the image or not; a first read control section for reading the image data using read addresses and read sequence corresponding to the rotation of image when the image data are read out from the first memory; a second memory for storing the image data read out from the first memory; and a second write control section for writing the image data into the second memory by write start address and write sequence corresponding to the rotation of the image stored in the first memory.

In a sixth aspect of the invention, there is provided an image processing apparatus capable of effecting image processing after a horizontal/vertical conversion where change is made from horizontal scanning to vertical scanning with treating image data as divided into block data and of effecting an inverse horizontal/vertical conversion again of the processing result thereof to form horizontally scanned image data, including: a first memory for storing the image data subjected to the image processing after the horizontal/vertical conversion; a first write control means for, when the image data are written into the first memory, writing the image data in different write sequence depending on whether a rotation of image is to be effected in forming the image or not; a first read control means for reading the image data using read addresses and read sequence corresponding to the rotation of image when the image data are read out from the first memory; a second memory for storing the image data read out from the first memory; and a second write control means for writing the image data into the second memory by write start address and write sequence corresponding to the rotation of the image stored in the first memory.

In a seventh aspect of the invention, the first memory in the image processing apparatus according to the first or fifth aspect is for storing a part of the image data and the second memory is for storing the entire image data in forming an image.

In an eighth aspect of the invention, the first memory in the image processing apparatus according to the first or fifth aspect comprises SRAM and the second memory comprises SDRAM.

In a ninth aspect of the invention, the first write control section in the image processing apparatus according to the first or fifth aspect effects control so that write sequence of the image data into the first memory is different between image not to be rotated and that to be rotated in forming the image.

In a tenth aspect of the invention, the first read control section in the image processing apparatus according to the first or fifth aspect effects control so that read start address and read sequence of the image data from the first memory are different corresponding to rotating directions of the image.

In an eleventh aspect of the invention, the first read control section in the image processing apparatus according to the tenth aspect effects control so that, of the rotating directions of the image, the image data in forming the image are read out by the same read start address and read sequence as those without the rotation of the image for one rotating direction and both the read start address and read sequence of image data are different for the other rotating direction.

In a twelfth aspect of the invention, the second write control section in the image processing apparatus according to the first or fifth aspect effects control so that write sequence of the image data is different corresponding to rotating directions of the image, and the first read control section effects control so that read start address and read sequence of the image are different corresponding to the rotating directions of the image.

In a thirteenth aspect of the invention, the first read control section in the image processing apparatus according to the twelfth aspect effects control so that, of the rotating directions of the image, the image data in forming the image are read out by the same read start address and read sequence as those without the rotation of the image for one rotating direction and both the read start address and read sequence of image data are different for the other rotating direction.

In a fourteenth aspect of the invention, the first memory control section in the image processing apparatus according to the third aspect effects control so that the write start address is the same and the write sequence is different of the image data into the first memory between image not to be rotated and that to be rotated in forming the image and at the same time effects control so that read start address and read sequence from the first memory are different corresponding to rotating directions of the image.

In a fifteenth aspect of the invention, the first write control section in the image processing apparatus according to the first or fifth aspect writes in such a data arrangement that data having the same bit width as the data to be written into the second memory can be read out in the same cycle from the first memory.

In a sixteenth aspect of the invention, the image processing apparatus according to the first or fifth aspect further includes an instructing section for giving instructions relating to direction and angle of the rotation of image in forming the image, wherein the first write control section, first read control section and second write control section control the writing into and reading from the first and second memories based on the instructions from the instructing section.

In a seventeenth aspect of the invention, the first memory, first write control section, first read control section, and second write control section in the image processing apparatus according to the first or fifth aspect are formed on the same one semiconductor substrate.

In an eighteenth aspect of the invention, there is provided an image processing method including the steps of: storing image data into a first memory in different write sequence depending on whether a rotation of image is to be effected in forming the image or not; reading image data from the first memory using read start address and read sequence corresponding to the rotation of image; and writing the image data read out from the first memory into a second memory by a write start address and write sequence corresponding to the rotation of the image written and stored into the first memory.

In a nineteenth aspect of the invention, there is provided an image processing apparatus including: a first storage section for reading or writing image data by a first data unit composed of a first data length multiplied by a predetermined data amount; and a second storage section for reading or writing image data rendered by a second data unit different from the first data unit by treating the image data read out from the first storage section with an image processing when a rotation of image is to be effected in forming the image.

In a twentieth aspect of the invention, there is provided an image processing apparatus including: a first storage means for reading or writing image data by a first data unit composed of a first data length multiplied by a predetermined data amount; and a second storage means for reading or writing image data rendered by a second data unit different from the first data unit by treating the image data read out from the first storage means with an image processing when a rotation of image is to be effected in forming the image.

In a twenty-first aspect of the invention, there is provided an image processing apparatus including: a first storage section for storing image data; an image processing section for effecting image processing of the stored image data after converting the scan direction of the image data corresponding to an image rotation information at the time of effecting a rotation of image in forming the image; and a second storage section for, when image data subjected to the image processing at the image processing section are written, writing by a first data unit composed of a first data length multiplied by a predetermined data amount in an address sequence corresponding to the image rotation information and for reading in an address sequence corresponding to the image rotation information when the written image data are read out. The image data read out from the second storage section are written into the first storage section in an address sequence corresponding to the image rotation information.

In a twenty-second aspect of the invention, there is provided an image processing apparatus including: a first storage means for storing image data; an image processing means for effecting image processing of the stored image data after converting the scan direction of the image data corresponding to an image rotation information at the time of effecting a rotation of image in forming the image; and a second storage means for, when image data subjected to the image processing at the image processing means are written, writing by a first data unit composed of a first data length multiplied by a predetermined data amount in an address sequence corresponding to the image rotation information and for reading in an address sequence corresponding to the image rotation information when the written image data are read out. The image data read out from the second storage means are written into the first storage means in an address sequence corresponding to the image rotation information.

In a twenty-third aspect of the invention, there is provided an image processing apparatus including: a scan direction converting section for reading image data to be used in forming an image stored in a storage section and for converting the scan direction of the read image data; an image processing section for effecting image processing of the image data converted at the scan direction converting section; and a storage control section for storing image data with controlling read or write address so that the image data processed at the image processing section become image data rotated corresponding to a rotation information of image in forming the image.

In a twenty-fourth aspect of the invention, there is provided an apparatus including: a scan direction converting means for reading image data to be used in forming an image stored in a storage means and for converting the scan direction of the read image data; an image processing means for effecting image processing of the image data converted at the scan direction converting means; and a storage control means for storing image data with controlling read or write address so that the image data processed at the image processing means become image data rotated corresponding to a rotation information of image in forming the image.

BRIEF DESCRIPTION OF THE DRAWINGS

FIGS. 8A, 8B, and 8C illustrate the manner of writing/reading into/from SRAM of output DMA in the image processing section shown in FIG. 2.

FIGS. 9A and 9B show a pixel data array on SDRAM and the manner of writing into SRAM in the processing without rotation in the embodiment.

FIGS. 13A, 13B, and 13C show an address generation sequence in writing into SDRAM.

DESCRIPTION OF THE PREFERRED EMBODIMENT

Figure 1:
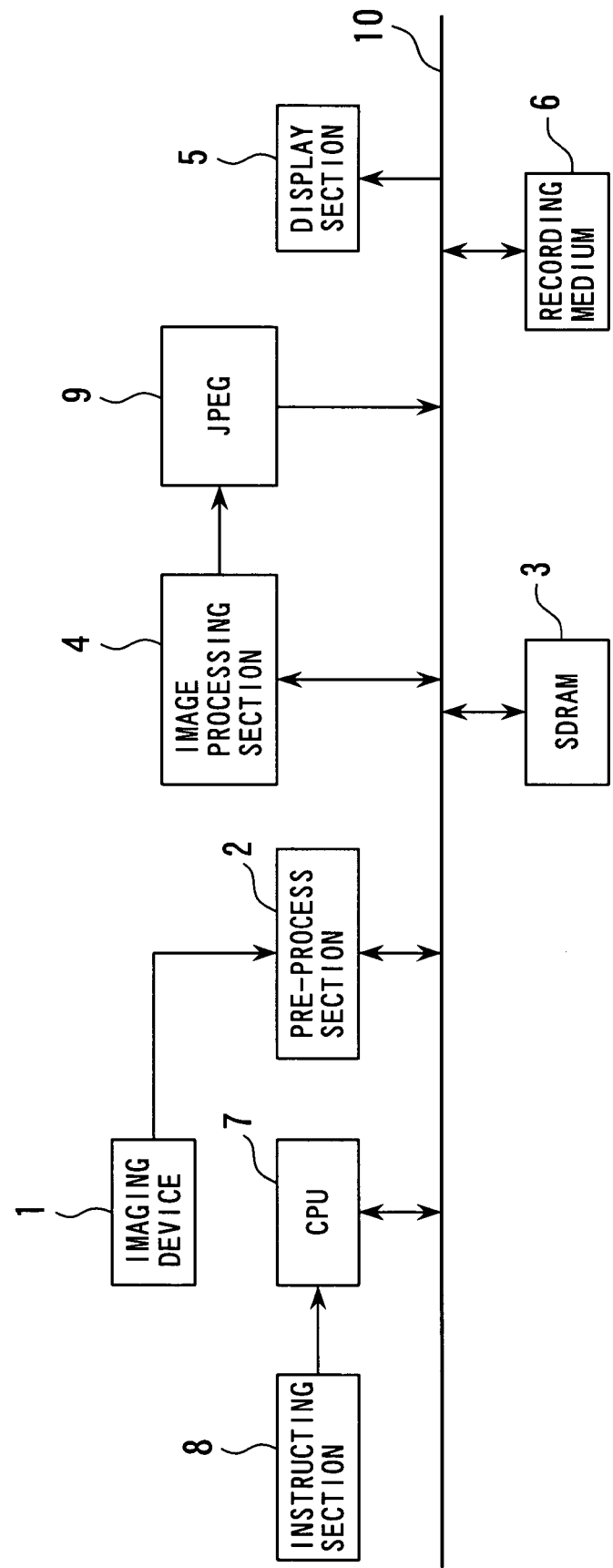
FIG. 1 is an abridged block diagram showing an embodiment of the image processing apparatus according to the invention.

Some embodiments of the invention will now be described. FIG. 1 is an abridged block diagram showing an embodiment of the image processing apparatus according to the invention. In this embodiment, the image processing apparatus according to the invention is applied to a digital camera. FIG. 1 includes: 1, an imaging device such as CCD; 2, a pre-process section; 3, SDRAM; 4, an image processing section; 5, a display section; 6, a recording medium such as a memory card; 7, CPU for controlling each section; 8, an operation instructing section for CPU 7; 9, JPEG processing section; and 10, a bus.

First, a description will be given with respect to an outline of the image processing procedure of the image processing apparatus having such construction. The imaging signals outputted from the imaging device 1 are subjected to such pre-process as gain control and A/D conversion at the pre-process section 2, and image data obtained by the pre-process processing are once stored into SDRAM 3. Subsequently, the image data are read out from SDRAM 3 and are inputted into the image processing section 4 through an input DMA within the image processing section. At this time, the image data corresponding to one frame is stripped into a number of small block image data (referred to as block line), and subsequently the horizontally scanned data are subjected to a horizontal/vertical conversion into vertically scanned data and are subjected to various processing within the image processing section 4. The image data after the image processing are then stored into SDRAM 3 again through the output DMA within the image processing section 4. At this time, an inverse horizontal/vertical conversion of the vertically scanned data into horizontally scanned data is effected and a rotation processing is effected at the same time. The image data stored into SDRAM 3 after the image processing are displayed on the display section 5 through bus 10. Further, the image data after the image processing are compressed by JPEG at the JPEG processing section 9 and then recorded into the recording medium 6 through bus 10.

Figure 2:
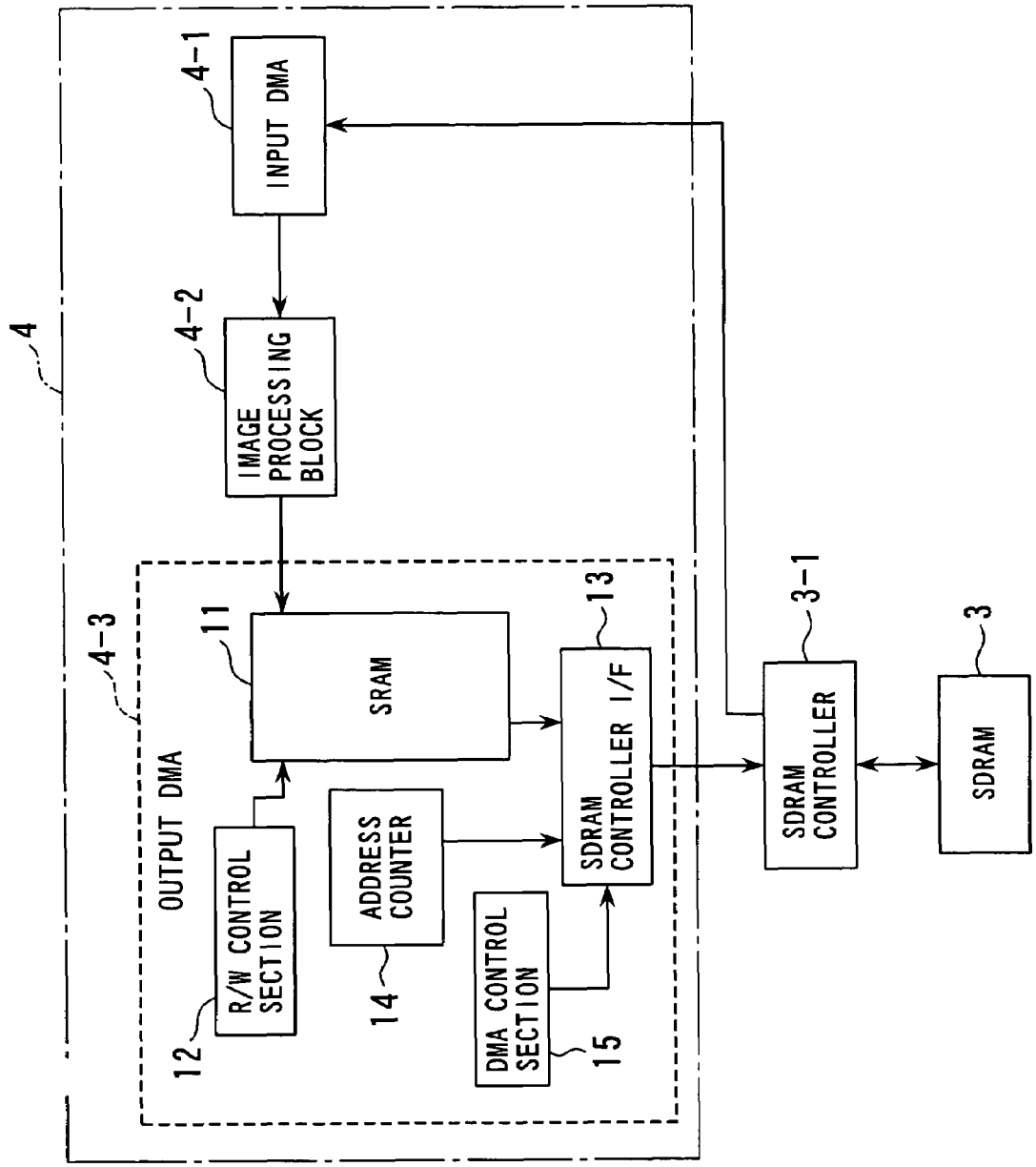
FIG. 2 is a block diagram showing construction of an image processing section in the embodiment shown in FIG. 1.

A detailed description will now be given by way of FIG. 2 with respect to a certain portion of construction for executing the rotation processing operation in the present embodiment. Referring to FIG. 2, numeral 4 denotes the image processing section shown in FIG. 1 including an input DMA 4-1, image processing block 4-2, and output DMA 4-3. Numeral 3-1 denotes SDRAM controller and 3 denotes the SDRAM shown in FIG. 1. The output DMA 4-3 here includes: SRAM 11 serving as a buffer for receiving data from the image processing block 4-2; R/W control section 12 for controlling read/write of SRAM 11; SDRAM controller I/F 13 for outputting data to the SDRAM controller 3-1; an address counter 14 for generating write address into SDRAM 3; and DMA control section 15 for controlling the SDRAM controller I/F 13.

It should be noted that each component member of the above described output DMA 4-3 is integrally formed on one semiconductor substrate, and it is also possible that the entire image processing section 4 including output DMA 4-3 be integrally formed on one semiconductor substrate. Further, operation of the image processing section 4 including the output DMA 4-3 is controlled by control signals from CPU 7 based on instructions of the instructing section 8. The instructions for the rotating direction and rotating angle in the case of effecting a rotation processing for example can be given from the instructing section 8. The image data processed at the image processing section 4 can also be directly delivered to the JPEG processing section 9. After JPEG compression, then, the image data are recorded into the recording medium 6 via bus 10. The JPEG processing section 9 may also be considered as included in the imaging section.

Figure 3:
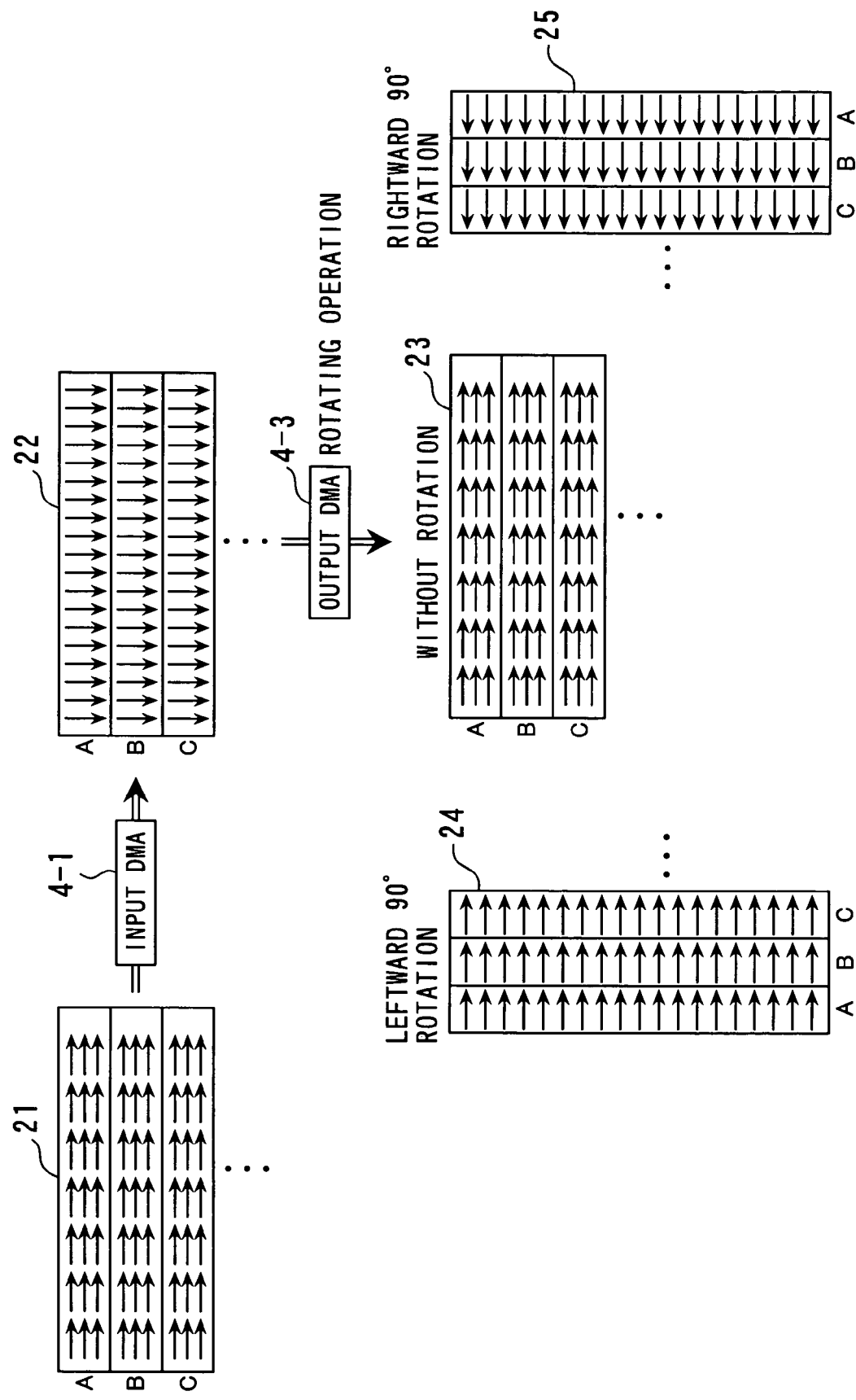
FIG. 3 is a conceptual diagram for explaining rotation processing in the image processing section shown in FIG. 2.

The concept of the image processing operation including a rotating operation by the image processing section 4 having such construction will now be described by way of FIG. 3. It should be noted that a rotation processing of image here does not mean a rotation by an arbitrarily selected angle but refers to a rotation processing by a multiple of 90° and particularly to the processing where a rotation of 90° is made in the left and right directions. Referring to FIG. 3, numeral 21 denotes image data stored in SDRAM 3, and the image data 21 are read out by block line to the image processing block 4-2 through the input DMA 4-1. At this time, the image data are subjected to a horizontal/vertical conversion at the input DMA 4-1 and are treated with various image processing at the image processing block 4-2. In FIG. 3, A, B, C in the image data 21 in SDRAM 3 correspond to block lines. The arrows, on the other hand, do not indicate the direction of arrangement of the image data but signify that the pixel data stored in SDRAM 3 are read out in the sequence of arrows →, are processed at the image processing block 4-2, and are outputted to the output DMA 4-3 in the sequence of arrows →. In other words, the horizontally scanned image data 21 are subjected to image processing after a horizontal/vertical conversion into the vertically scanned image data 22 and are outputted to the output DMA 4-3.

In normal image processing without involving a rotation processing, image processing is effected on the vertically scanned image data after the horizontal/vertical conversion as indicated by the image data 21 to image data 22 in FIG. 3. The data after the image processing are then subjected to horizontal/vertical conversion (inverse conversion) again through the output DMA 4-3 to be returned into horizontally scanned data as indicated by the image data 23 in FIG. 3 and are stored into SDRAM 3.

When the image data read out and inputted in such sequence are processed at the image processing section 4 where the image processing block 4-2 has a plurality of stages of image process circuits, the processing can be effected so that data that can be treated as a desired image are fetched from the image process circuit at the final stage.

Here, in reading data having a certain length in row direction are read out repeatedly along column direction in this manner, i.e., when the horizontally scanned data are read out from SDRAM 3, the readout data are partially overlapped when read out. The reason for this is as follows. In particular, a discrepancy in the number of data between the inputted data and the outputted data occurs when spatial image processing is sequentially executed through the image process circuits of the image processing section 4. In spatial filtering, for example, computation using data of some points-surrounding the data to be processed are required to obtain a processed data to be outputted so that the surrounding extra data required in the processing computation are necessary in addition to the output data. In the case where a plurality of stages of image processing are to be effected, the processing as described above is consecutively effected so that, if sequential processing is effected, data of a region gradually becoming smaller than input data are outputted. Accordingly, in order to output image data corresponding to one full frame from the image process circuit at the final stage, the input data to the initial-stage image process circuit must be data that are read out in a partially overlapped manner.

Figure 4:
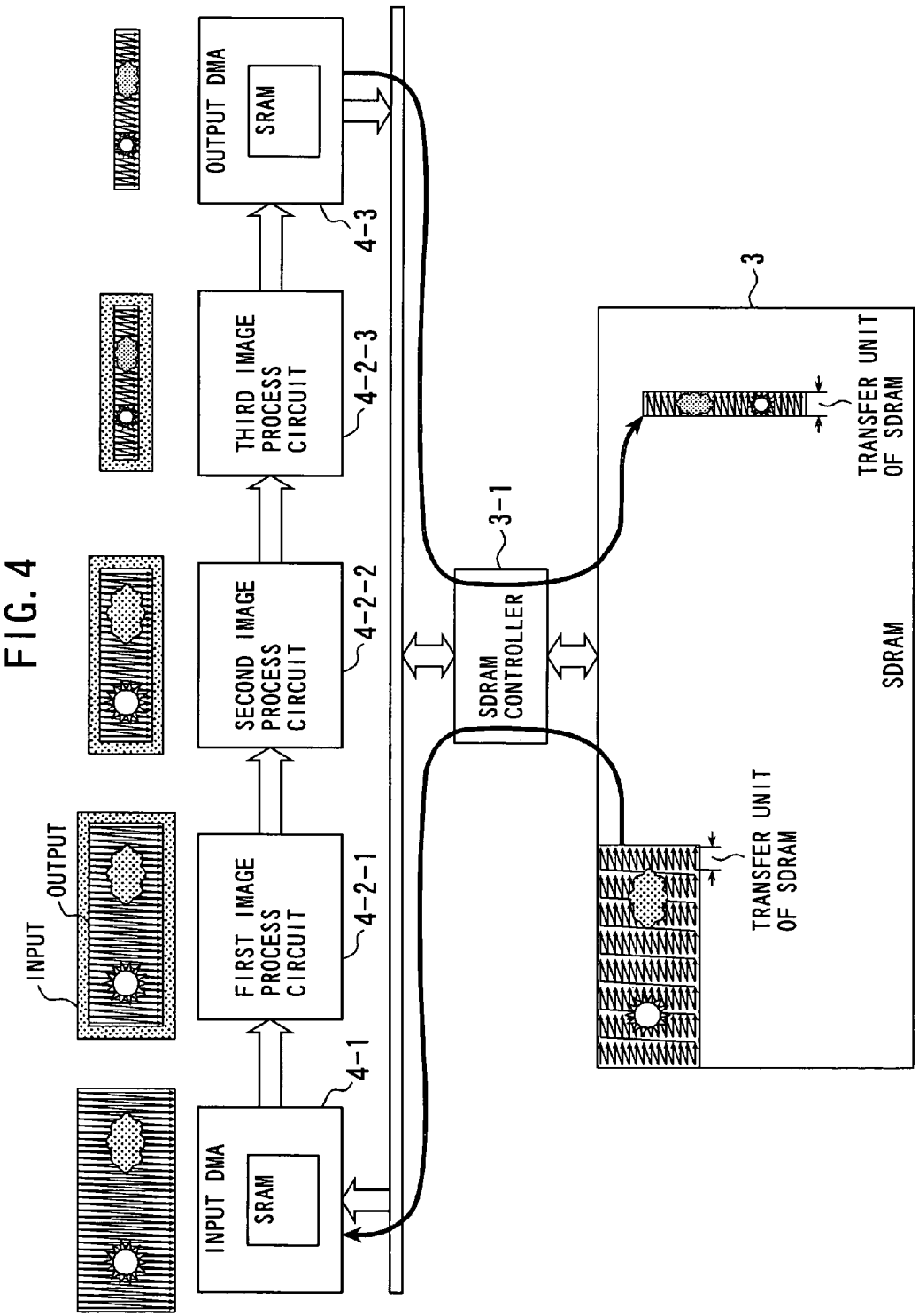
FIG. 4 illustrates the manner of input image data into each image process circuit in the case of processing by a plurality of stages of image process circuit in the image processing block of the image processing section.

An example of such mode is shown in FIG. 4. The illustrated mode shows the outputs of the image process circuit at each stage when the image processing block 4-2 is composed of three stages of first to third image process circuits 4-2-1, 4-2-2, 4-2-3. In short, input data width of each image process circuit at the preceding stages is previously set so that only the necessary data remain in the final image data. It should be noted that FIG. 4 shows the manner of image processing involving a counterclockwise 90° rotation processing.

When spatial image processing is effected by the image process circuit in this manner, the peripheral data required in processing (margin for overlapped width) must be inputted in addition to the data to be outputted. For this reason, it is necessary to read in overlap what corresponds to the peripheral data required in the processing, i.e., data added to the output data considered as necessary in the processing at both ends for the data having a certain length in row direction. It should be noted that, the peripheral data required in the processing along column direction are added only to the both ends of data of each column direction.

A description will now be given in further detail with respect to readout from frame memory (SDRAM 3). In reading from frame memory, a read method as shown in FIG. 4 is effected. It is an assumption here to use SDRAM as the frame memory, and in SDRAM a readout by burst transfer is characteristically effected to read at high rate. It should be noted that the repetition of data in each row direction having data length indicated by "transfer unit of SDRAM" represents a burst length in the burst transfer readout.

Figure 5A:
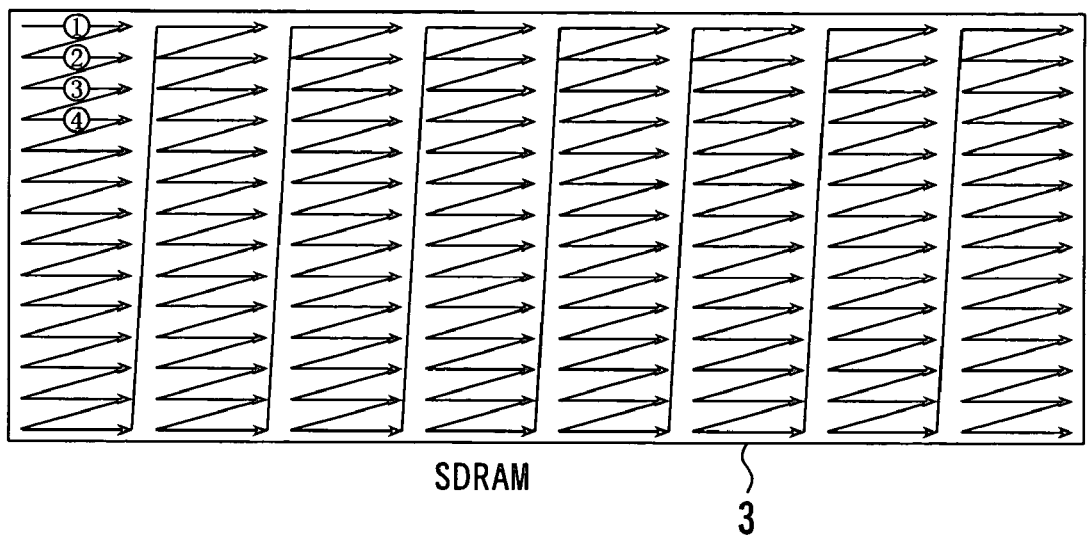
FIGS. 5A and 5B illustrate the manner of writing data from a frame memory (SDRAM) into SRAM of input DMA in the image processing section.
Figure 5B:
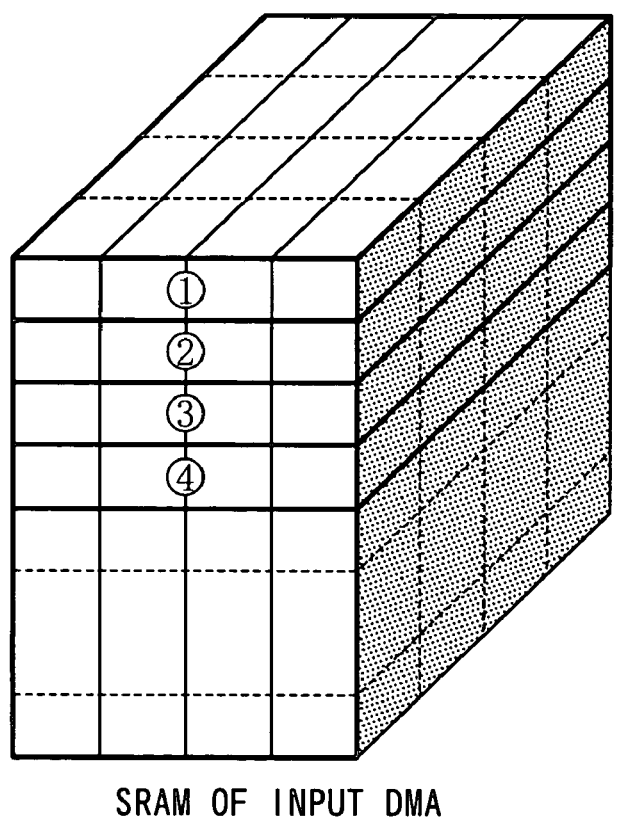
Figure 6:
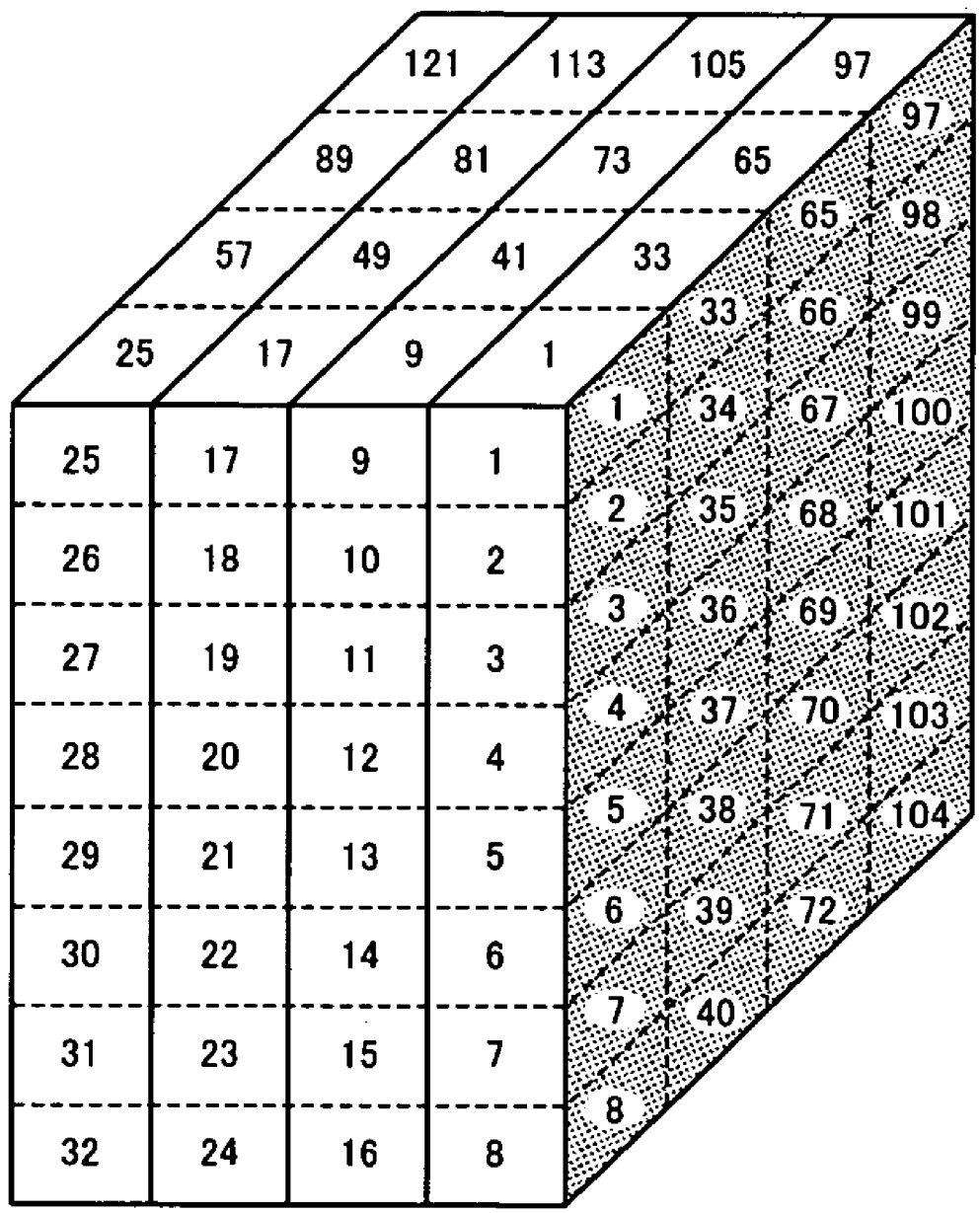
FIG. 6 illustrates the manner of reading data from SRAM of input DMA.

A description will now be given by way of FIGS. 5A, 5B, and FIG. 6 with respect to data transfer from the frame memory (SDRAM 3) through the input DMA 4-1 to the first image process circuit 4-2-1 at the initial stage. In this data transfer, data read out along column direction by burst transfer readout at the frame memory (SDRAM 3) are required to be rearranged along vertical (row) direction at the input DMA 4-1 to be inputted into the first image process circuit 4-2-1. For this purpose, data read out from the frame memory (SDRAM 3) as shown in FIG. 5A are written into SRAM of input DMA 4-1 shown in FIG. 5B by "Burst length (=transfer unit of SDRAM)×Initial-stage input data width (the number of pixels in vertical direction to be read at input DMA 4-1=vertical pixel number to the first image process circuit 4-2-1)". Here, the encircled numerals in FIG. 5A represent the burst transfer read sequence from SDRAM 3, and the encircled numerals in FIG. 5B represent the write sequence into SRAM of the input DMA 4-1. Next, data are read out from SRAM of the input DMA 4-1 along vertical (row) direction in the order of numerals shown in FIG. 6 and are inputted into the first image process circuit 4-2-1. The processed data along each vertical (row) direction of the first image process circuit 4-2-1 are then inputted into the second image process circuit 4-2-2.

Subsequently, after the processing at the second image process circuit 4-2-2, data outputted from the third image process circuit 4-2-3 at the final stage are altered into horizontally scanned data by effecting horizontal/vertical conversion (inverse conversion) again through the output DMA 4-3 as shown by image data 23 of FIG. 3 and are stored into SDRAM 3.

Here, if rotation of image is not to be effected, the data are transferred to the frame memory (SDRAM 3) at the timing point when data of "Burst length×Final-stage input data width" are stored into SRAM of the output DMA 4-3. The reason for this is that, in order to effect horizontal/vertical conversion, data corresponding to burst length in horizontal direction are required within SRAM of the output DMA 4-3. If rotation processing is to be effected, on the other hand, transfer is effected at the timing point when data of "N×burst length" are stored into SRAM of the output DMA 4-3. Here, "N" can be arbitrarily set within a range allowed by SRAM capacity of the output DMA 4-3. If N=4, for example, the image rotation processing can be effected by four lines. In data transfer from the output DMA 4-3 to the frame memory (SDRAM 3), the data are transferred with changing the addressing method of the frame memory (SDRAM 3) depending on whether image is to be rotated or not.

Figure 7A:
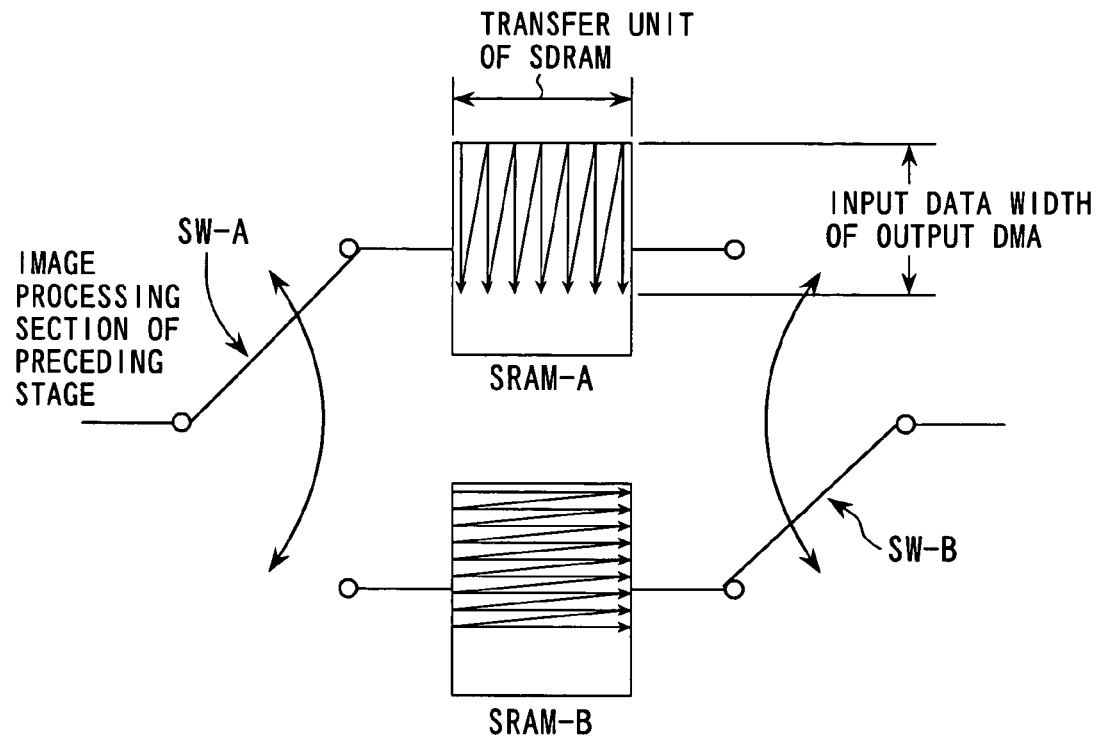
FIGS. 7A and 7B illustrate the manner of inputting/outputting of data into/from SRAM of output DMA.
Figure 7B:
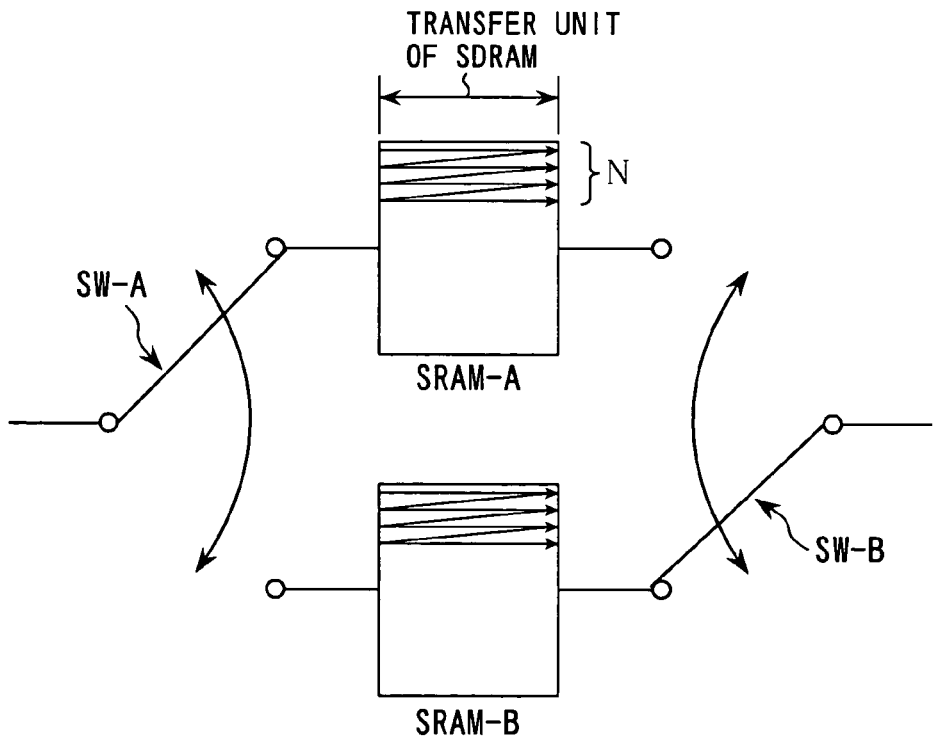

A detailed description will now be given by way of FIGS. 7A and 7B with respect to flow of data (scan direction) in writing data to SRAM of the output DMA 4-3 and reading data therefrom. FIG. 7A shows flow of data in the case without rotation and FIG. 7B shows flow of data in the case of causing a rotation. In actuality, two units, SRAM-A and SRAM-B, are used as SRAM at the output DMA 4-3 so that these two SRAM-A and SRAM-B are alternately switched (butterfly operation) by two changeover switches SW-A, SW-B that are provided before and after these to cause data to be inputted/outputted.

In the case without rotation as shown in FIG. 7A, then, vertically scanned data from the final-stage image process circuit are written vertically without modification into SRAM-A, and vertically written data are horizontally read out and outputted from SRAM-B. In the case of causing a rotation as shown in FIG. 7B, on the other hand, vertically scanned data from the final-stage image process circuit are written into SRAM-A as rearranged along the horizontal direction, and the horizontally written data are read out horizontally without modification from SRAM-B and are transferred to the frame memory. In this case, however, the addressing method of the frame memory is changed according to the direction of rotation as will be described later in detail.

In the present invention, thus, image data of necessary data amount are obtained while effecting image processing such that data that are once subjected to horizontal/vertical conversion by data unit suitable for image processing are used to effect image processing even when a rotation of image is not required. Accordingly, when stored into the frame memory (SDRAM 3) again, an image treated with image processing and rotated as image is readily obtained.

The mode of effecting rotation processing will now be described with reference to FIG. 3 again. In the case of rotation processing where data rotated by 90° toward left or right are to be stored into SDRAM 3, the vertically scanned image data 22 after image processing by the image processing block 4-2 are written into SRAM 11 of the output DMA 4-3 as horizontally scanned image data. When read out from SRAM 11, these are read also as horizontally scanned data as shown by image data 24 (90° rotation toward left) or image data 25 (90° rotation toward right) of FIG. 3. The image data are thereby transferred and stored into SDRAM 3 in their rotated form.

The image processing operation involving the above described rotation will now be described in further detail with reference to FIGS. 8A to 8C. First, the reason for effecting horizontal/vertical conversion as the above in the image processing will be described in the following. The burst transfer is used in reading or writing data from or into SDRAM for the purpose of improving transfer efficiency by expanding bandwidth for SDRAM. In particular, control is effected so that some rounded data in horizontal direction from some address in SDRAM are read at a time. Accordingly, when read/written from/into SDRAM, there is a restriction that data must written along horizontal direction. In the case of effecting processing by blocks for example in compression processing, on the other hand, since it is preferable to have data that are scanned vertically, a horizontal/vertical conversion of image data of divided blocks is required in the image processing.

In the case of normal processing operation without rotation processing, the vertically scanned data after image processing to be inputted into SRAM 11 of the output DMA 4-3 are stored vertically without modification into SRAM 11 as shown in FIG. 8A. It is supposed that, in FIGS. 8A to 8C, the vertical stripes represent the direction along which addresses of SRAM 11 are arranged. When the image data are to be read from SRAM 11, they are read out horizontally as shown in FIG. 8B. A horizontal/vertical conversion (inverse conversion) is effected by such writing (storing) into and reading from SRAM 11. When the image data are delivered to SDRAM controller 3-1, image data inputted in a vertically scanned manner to the output DMA 4-3 are formed into the horizontally scanned original data arrangement again and are stored into SDRAM 3.

In the case of effecting rotation processing, on the other hand, the vertically scanned data after image processing to be inputted into SRAM 11 of the output DMA 4-3 are written in a horizontally scanned manner to SRAM 11 as shown in FIG. 8C. When read out from SRAM 11, then, they are read out as horizontally scanned in the same manner as the case without rotation as shown in FIG. 8B. They are thereby transferred to SDRAM 3 in a rotated form.

The manner of image processing including more specific rotation processing will now be described. First, a description will be given below with respect to specific processing procedure in the case without effecting rotation processing. FIG. 9A shows an arraying manner of image data composed of a large number of pixel data on SDRAM 3. The image data of SDRAM 3 are subjected to horizontal/vertical conversion at the input DMA 4-1 of the image processing section 4 to be converted into vertically scanned data, and, after treated with various image processing at the image processing block 4-2, are written into SRAM 11 of the output DMA 4-3 in a manner as shown in FIG. 9B. In particular, as shown in FIG. 9B, SRAM 11 here is constituted by four leaves of memory A, B, C, D, and numerals assigned to each of these memories represent the storing order of each pixel data of the image data. The mode shown here is of the writing/storing of data corresponding to a total of 16 lines such that the pixel data corresponding to one line of 1 to 8 are written into memory A, pixel data of one line of 9 to 16 to memory B, pixel data of one line of 17 to 24 to memory C, pixel data of one line of 25 to 32 to memory D, and pixel data of one line of 33 to 40 again to the first memory A.

Figure 10:
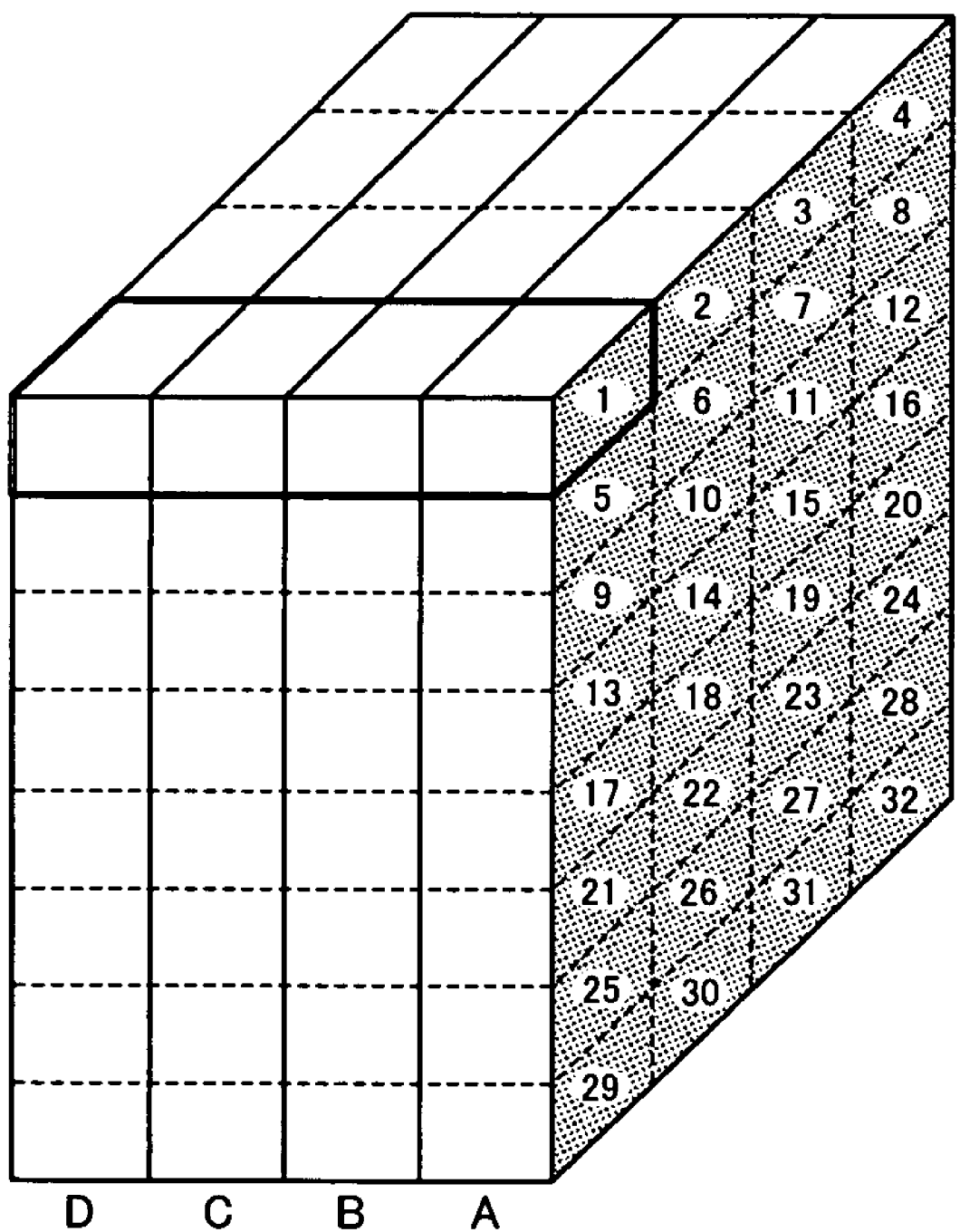
FIG. 10 illustrates the manner of reading from SRAM in the processing without rotation.

A description will now be given by way of FIG. 10 with respect to the read procedure of image data from SRAM 11 into which image data are stored as described. Referring to FIG. 10, numerals represent the read sequence from SRAM 11 into which the image data shown in FIG. 9B are stored, and the pixel data are read out in the order of such numerals. Here, in particular, four pixel data at locations corresponding to numeral "1" of the four memories A to D are simultaneously read out. In this case, pixel data of 1, 9, 17, 29 are to be simultaneously read. The reason for using such read technique is that, since bus width for SDRAM is usually set to 32 bits, the data bit number when reading four pixels at a time becomes 32 bits supposing one pixel data is of 8 bits and such data bit number corresponds to the bus width of SDRAM.

When pixel data at locations of the numbers of "2", "3", "4" in FIG. 10 are sequentially read out subsequently to the location of number "1" with using such technique where four pixels are simultaneously read out at a time in the order of numbers, the pixel data of 1, 9, 17, 25, 33, 41, 49, 57, 65, 73, 81, 89, 97, 105, 113, 121 are to be sequentially read out. It is seen that these pixel data correspond to the pixel data in the first horizontal line on SDRAM shown in FIG. 9A. The image data thus can be read out from SDRAM 3, subjected to horizontal/vertical conversion, treated with image processing, and subjected again to inverse horizontal/vertical conversion without a rotation to be stored into SDRAM 3.

Figures 11A, 11B:
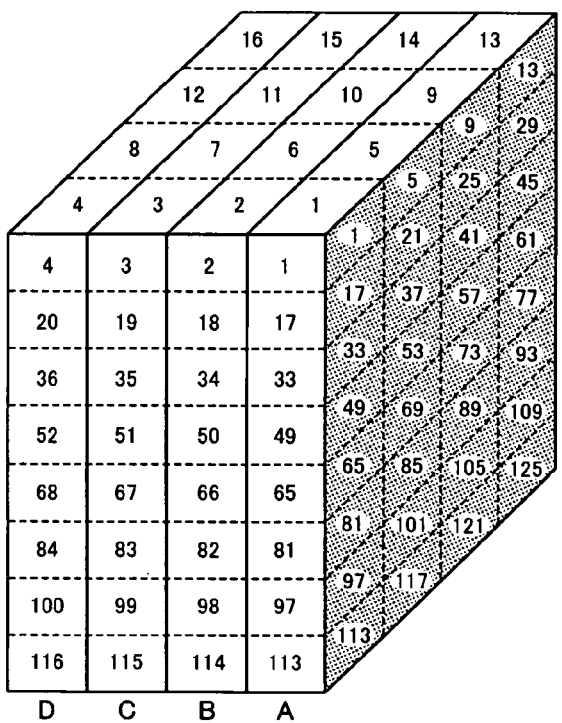
FIGS. 11A and 11B show a pixel data array on SDRAM and the manner of writing into SRAM in the processing with a rotation.

A description will now be given with respect to specific processing procedure for storing data into SDRAM with effecting a rotation processing. FIG. 11A shows an arraying manner of image data composed of a large number of pixel data on SDRAM 3 in the case of effecting a rotation processing. When the rotation processing is to be effected, the pixel data are stored into SRAM 11 in a different order from the case without rotation shown in FIG. 9B, i.e., in the order shown in FIG. 11B. In particular, data are written in the manner of horizontal scan to each of the four memories A to D.

Figure 12A:
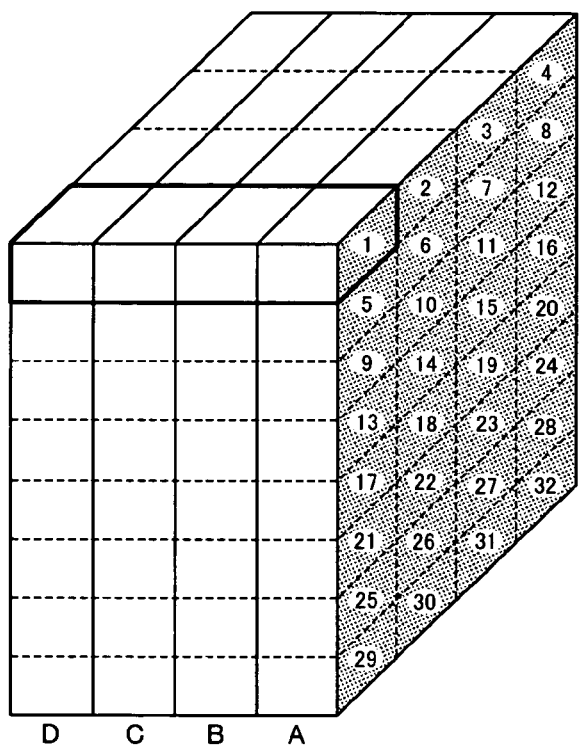
FIGS. 12A and 12B illustrate the manner of reading from SRAM in the processing with a rotation.

In the case of rotation processing of 90° toward left, four pixels of memories A to D are put together and read out at a time in the order of numerals shown in FIG. 12 similarly to the case of processing without rotation shown in FIG. 10. By thus sequentially reading pixel data at the first to fourth locations, the pixel data of 1, 2, 3, 4, 5, 6, 7, 8, 9, 10, 11, 12, 13, 14, 15, 16 are to be read out. It is seen that these pixel data correspond to the pixel data of one line in the vertical direction (row direction) on SDRAM shown in FIG. 11A. An image rotated by 90° toward left is obtained by horizontally outputting these pixel data that are sequentially read in the vertical direction. This will be described in detail when explaining address generation of SDRAM in the following.

The address generation of SDRAM will now be described. First, the generation sequence of address on SDRAM in the case of normal processing without rotation is as indicated by the numeral order in FIG. 13A. This means that data of 16 pixels for one burst transfer are stored to each address. Such addresses are sequentially outputted from the address counter 14 of the output DMA 4-3 and the writing into SDRAM 3 is controlled through the SDRAM controller I/F 13 to store the image data after image processing into SDRAM 3 without involving a rotation.

In the case of rotation processing of 90° toward left, the address generation sequence is as shown in FIG. 13B, and such addresses are sequentially mapped from lower regions of SDRAM 3. The data of 16 pixels are stored to each address shown in FIG. 13B, i.e., 1st to 16th pixel data to the lowest order address "1". By controlling the writing into SDRAM 3 with such address generation sequence, the pixel array of SDRAM shown in FIG. 11A is brought into its rotated condition by 90° toward left so that an image rotated by 90° toward left can be generated.

Figure 12B:
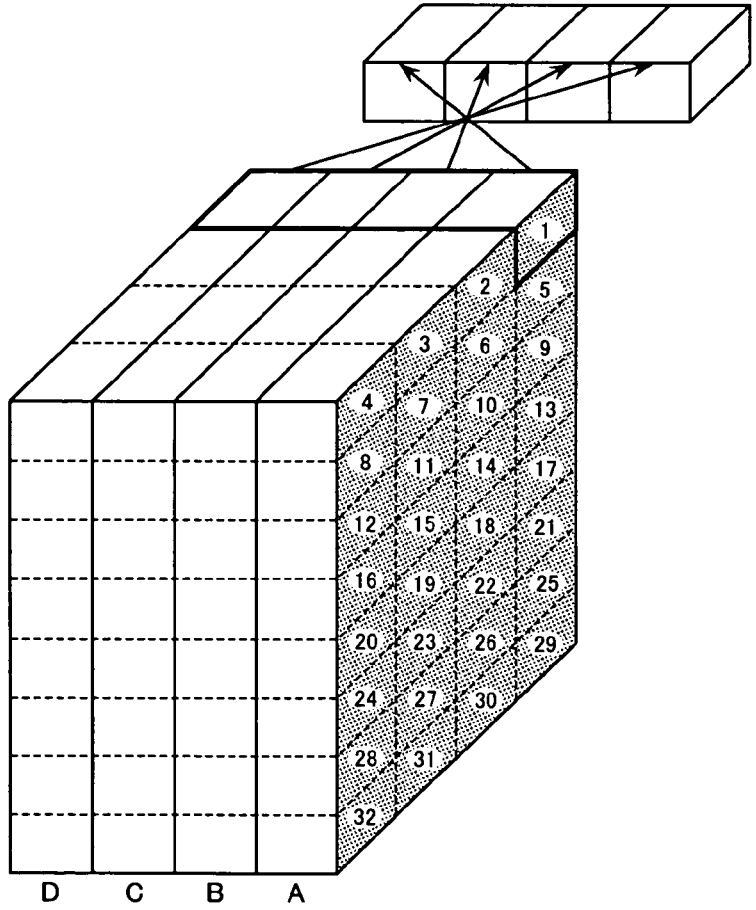

The processing procedure of rotation of 90° toward right will now be described. The writing into SRAM 11 is effected in a similar write sequence as the case of rotation processing of 90° toward left shown in FIGS. 11A and 11B. The data are read out from SRAM 11 in a manner different in two steps from the case of the rotation processing of 90° toward left shown in FIG. 12A. In particular, the read sequence is in a mode of sequentially reading from the back side toward front as shown in FIG. 12B opposite to the case of the rotation processing of 90° toward left shown in FIG. 12A. Further, though the fact of reading four pixel data of four memories A to D in one reading is the same as the case of the rotation processing of 90° toward left, the read sequence of the four pixels to be read at one time is in a mode inverting the read sequence in the case of the rotation processing of 90° toward left. By readout of the first to fourth locations in this manner, pixel data are read out in the order of 16, 15, 14, 13, 12, 11, 10, 9, 8, 7, 6, 5, 4, 3, 2, 1, and are outputted to SDRAM 3 in this order. The address generation sequence for writing thus outputted pixel data into SDRAM 3 must be made different from the case of the rotation processing of 90° toward left. In particular, the data read out from SRAM in the above order are sequentially stored into SDRAM 3 from the upper side thereof in an address generation sequence as shown in FIG. 13C. By controlling the writing into SDRAM 3 by such address generation sequence, the pixel array of SDRAM shown in FIG. 11A is brought into a mode rotated by 90° toward right, and an image rotated by 90° toward right is obtained.

As has been described by way of the above embodiment, with the image processing apparatus and image processing method according to the invention constructed as the above, an image is rotated when it is written into a first memory, data thereof are rearranged when read out from the first memory with controlling read start address and read sequence, and are rearranged when written into a second memory by write start address and write sequence corresponding to the rotation of the image so that a rotated image can be correctly read. A rotation of image thereby becomes possible with the same data access as a normal processing without rotation, and, therefore, an image processing and rotation processing can be effected by a simple construction without a special construction and without performing a complicated operation processing.

What is claimed is:

1. An image processing apparatus capable of effecting image processing after a horizontal/vertical conversion where change is made from horizontal scanning to vertical scanning on block data obtained by dividing image data without regard to a rotation processing of image data and of effecting an inverse horizontal/vertical conversion again of the processing result thereof to form horizontally scanned image data, said image processing apparatus comprising:

a temporary memory for temporarily storing input image data;

an image processing input section memory for storing data read out from said temporary memory into which image data are stored;

an image processing section for effecting at least a spatial image processing;

an input section memory control section for effecting control where data horizontally read out from said temporary memory are written into said image processing input section memory and data read out as vertically rearranged from the image processing input section memory are inputted into said image processing section;

a first memory for storing image data processed at said image processing section;

a first write control section for, when image data are written into the first memory, writing the image data in different write sequence depending on whether a rotation of image is to be effected in forming the image or not;

a first read control section for reading image data using read addresses and read sequence corresponding to said rotation of image when image data are read out from said first memory; and a second write control section for writing image data into said temporary memory by write start address and write sequence corresponding to the rotation of the image stored in said first memory.

2. An image processing apparatus capable of effecting image processing after a horizontal/vertical conversion where change is made from horizontal scanning to vertical scanning on block data obtained by dividing image data without regard to a rotation processing of image data and of effecting an inverse horizontal/vertical conversion again of the processing result thereof to form horizontally scanned image data, said image processing apparatus comprising:

a temporary memory for temporarily storing input image data;

an image processing input section memory for storing data read out from said temporary memory into which image data are stored;

an image processing means for effecting at least a spatial image processing;

an input section memory control means for effecting control where data horizontally read out from said temporary memory are written into said image processing input section memory and data read out as vertically rearranged from the image processing input section memory are inputted into said image processing means;

a first memory for storing image data processed at said image processing means;

a first write control means for, when image data are written into the first memory, writing the image data in different write sequence depending on whether a rotation of image is to be effected in forming the image or not;

a first read control means for reading image data using read addresses and read sequence corresponding to said rotation of image when image data are read out from said first memory; and a second write control means for writing image data into said temporary memory by write start address and write sequence corresponding to the rotation of the image stored in said first memory.

3. An image processing apparatus capable of effecting image processing after a horizontal/vertical conversion where change is made from horizontal scanning to vertical scanning on block data obtained by dividing image data without regard to a rotation processing of image data and of effecting an inverse horizontal/vertical conversion again of the processing result thereof to form horizontally scanned image data, said image processing apparatus comprising:

a temporary memory for temporarily storing input image data;

an image processing input section memory for storing data read out from said temporary memory into which image data are stored;

an image processing section for effecting at least a spatial image processing;

an input section memory control section for effecting control where data horizontally read out from said temporary memory are written into said image processing input section memory and data read out as vertically rearranged from the image processing input section memory are inputted into said image processing section;

a first memory for storing image data processed at said image processing section;

a first memory control section for, when an image is to be formed with a rotation of the image, writing image data with controlling write start address and write sequence into said first memory and for reading the image data in a rearranged manner with controlling read sequence of said first memory corresponding to said rotation of the image data; and a second memory control section for, when image data read out from said first memory are written into said temporary memory, writing the image data in a rearranged manner with controlling write sequence into said temporary memory corresponding to the rotation of the image data stored in said first memory.

4. An image processing apparatus capable of effecting image processing after a horizontal/vertical conversion where change is made from horizontal scanning to vertical scanning on block data obtained by dividing image data without regard to a rotation processing of image data and of effecting an inverse horizontal/vertical conversion again of the processing result thereof to form horizontally scanned image data, said image processing apparatus comprising:

a temporary memory for temporarily storing input image data;

an image processing input section memory for storing data read out from said temporary memory into which image data are stored;

an image processing means for effecting at least a spatial image processing;

an input section memory control means for effecting control where data horizontally read out from said temporary memory are written into said image processing input section memory and data read out as vertically rearranged from the image processing input section memory are inputted into said image processing means;

a first memory for storing image data processed at said image processing means;

a first memory control means for, when an image is to be formed with a rotation of the image, writing image data with controlling write start address and write sequence into said first memory and for reading the image data in a rearranged manner with controlling read sequence of said first memory corresponding to said rotation of the image data; and a second memory control means for, when image data read out from said first memory are written into said temporary memory, writing the image data in a rearranged manner with controlling write sequence of said temporary memory corresponding to the rotation of the image data stored in said first memory.

5. The image processing apparatus according to claim 1, wherein said first memory is for storing a part of the image data and said temporary memory is for storing the entire image data in forming an image.

6. The image processing apparatus according to claim 1, wherein said first memory comprises SRAM and said temporary memory comprises SDRAM.

7. The image processing apparatus according to claim 1, wherein said first write control section effects control so that write sequence of the image data into said first memory is different between image not to be rotated and that to be rotated in forming the image.

8. The image processing apparatus according to claim 1, wherein said first read control section effects control so that read start address and read sequence of said image data from said first memory are different corresponding to rotating directions of the image.

9. The image processing apparatus according to claim 8, wherein said first read control section effects control so that, of the rotating directions of said image, the image data in forming the image are read out by the same read start address and read sequence as those without the rotation of the image for one rotating direction and both the read start address and read sequence of image data are different for the other rotating direction.

10. The image processing apparatus according to claim 1, wherein said second write control section effects control so that write sequence of the image data is different corresponding to rotating directions of the image, and said first read control section effects control so that read start address and read sequence of the image are different corresponding to the rotating directions of the image.

11. The image processing apparatus according to claim 10, wherein said first read control section effects control so that, of the rotating directions of said image, the image data in forming the image are read out by the same read start address and read sequence as those without the rotation of the image for one rotating direction and both the read start address and read sequence of image data are different for the other rotating direction.

12. The image processing apparatus according to claim 3, wherein said first memory control section effects control so that the write start address is the same and the write sequence is different of the image data into said first memory between image not to be rotated and that to be rotated in forming the image and at the same time effects control so that read start address and read sequence from said first memory are different corresponding to rotating directions of the image.

13. The image processing apparatus according to claim 1, wherein said first write control section writes in such a data arrangement that data having the same bit width as the data to be written into said temporary memory can be read out in the same cycle from said first memory.

14. The image processing apparatus according to claim 1 further comprising an instructing section for giving instructions relating to direction and angle of the rotation of image in forming the image, wherein said first write control section, first read control section and second write control section control the writing into and reading from said first and temporary memories based on the instructions from said instructing section.

15. The image processing apparatus according to claim 1, wherein said first memory, first write control section, first read control section, and second write control section are formed on the same one semiconductor substrate.

16. An image processing method capable of effecting image processing after a horizontal/vertical conversion where change is made from horizontal scanning to vertical scanning on block data obtained by dividing image data without regard to a rotation processing of image data and of effecting an inverse horizontal/vertical conversion again of the processing result thereof to form horizontally scanned image data, said image processing method including the steps of:

horizontally reading and writing into an image processing input memory image data from a temporary memory into which input image data is temporary stored and inputting into an image processing section image data read out as vertically rearranged from the image processing input memory;

storing image data processed at said image processing section into a first memory in different write sequence depending on whether a rotation of image is to be effected in forming the image or not;

reading image data from said first memory using read start address and read sequence corresponding to said rotation of image; and writing the image data read out from said first memory into said temporary memory by a write start address and write sequence corresponding to the rotation of the image written and stored into said first memory.

* * * * *